(12) United States Patent  
Radosavljevic et al.

(10) Patent No.: US 6,969,801 B2  
(45) Date of Patent: Nov. 29, 2005

(54) SHUTTERED RECEPTACLE FOR A PROTECTIVE DEVICE

(75) Inventors: Dejan Radosavljevic, La Fayette, NY (US); Richard Weeks, Little York, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 29 days.

(21) Appl. No.: 10/645,359

(22) Filed: Aug. 21, 2003

(65) Prior Publication Data

US 2005/0039938 A1    Feb. 24, 2005

(51) Int. Cl.[7] .............................................. H01R 13/46
(52) U.S. Cl. ......................... 174/53; 174/58; 439/106; 439/107
(58) Field of Search .................... 174/53, 58; 439/535, 439/107, 106; 385/76, 92

(56) References Cited

U.S. PATENT DOCUMENTS

| | | | |
|---|---|---|---|
| 4,529,834 A * | 7/1985 | Nattel | 174/53 |
| 6,425,694 B1 * | 7/2002 | Szilagyi et al. | 385/76 |
| 6,688,780 B2 * | 2/2004 | Duran | 385/76 |
| 6,734,769 B1 | 5/2004 | Germain et al. | |
| 6,884,111 B2 * | 4/2005 | Gorman | 439/535 |
| 2004/0179787 A1 * | 9/2004 | Glazowski et al. | 385/76 |
| 2004/0212466 A1 | 10/2004 | Germain et al. | |
| 2005/0013066 A1 | 1/2005 | Germain et al. | |
| 2005/0024171 A1 | 2/2005 | Germain et al. | |

FOREIGN PATENT DOCUMENTS

| | | |
|---|---|---|
| WO | WO 2004/066327 | 8/2004 |
| WO | WO 2004/070906 | 8/2004 |

* cited by examiner

Primary Examiner—Dhiru R. Patel  
(74) Attorney, Agent, or Firm—Daniel P. Malley; Bond, Schoeneck & King PLLC

(57) ABSTRACT

The present invention is a protection device that is coupled to a power source in an electric power distribution system. The protection device is configured to protect a portion of the power distribution system from at least one fault condition. The device includes line terminals configured to be coupled to the power source when a proper wiring condition is effected. A receptacle member includes receptacle openings configured to accommodate plug contact blades. Receptacle contacts are disposed in the receptacle member and coupled to the line terminals. An electrical connection is established between the receptacle contacts and the line terminals. At least one protective shutter is movable between a closed position and an open position. The at least one protective shutter is disposed between the receptacle openings and the receptacle contacts in the closed position to prevent the plug blades from making contact with the receptacle contacts. A mis-wiring sensor is coupled to the line terminals. The mis-wiring sensor is configured to sense the proper wiring condition and actuate the protective shutter in response thereto, such that the protective shutter moves from the closed position to the open position. After which, the plug blades are permitted to make contact with the receptacle contacts upon insertion of the plug blades into the receptacle openings.

25 Claims, 6 Drawing Sheets

SHUTTERED RECEPTACLE FOR A PROTECTIVE DEVICE

BACKGROUND OF THE INVENTION

1. Field of the Invention

The present invention relates generally to electrical protection devices, and particularly to electrical protection devices with mis-wire safety features.

2. Technical Background

Ground fault circuit interrupters (GFCIs), and arc fault circuit interrupters (AFCIs) are examples of protective devices in electric circuits. These devices may be disposed in a receptacle that is subsequently installed in a wall box. The receptacle has line terminals for connection to the power line, and load terminals for connection to a load. The protective device has interrupting contacts for breaking the connection between the line terminals and load terminals when the protective device detects a fault condition. The connection is broken to interrupt the load current and thereby remove the fault condition. Fault conditions include those that result in risk electrocution of personnel, or fire.

The load terminals include receptacle contacts and feed-thru terminals. The receptacle contacts are configured to accommodate the blades of an attachment plug, which are inserted to provide power to a load. Feed-thru terminals, on the other hand, are configured to accommodate wires which are connected to one or more additional receptacles, known as a downstream receptacles. The downstream receptacle may include a string of downstream receptacles that comprise a branch circuit of an electrical distribution system.

In a typical related art approach, the receptacle contacts and feed-thru terminals remain electrically connected irrespective of whether the interrupting contacts are open or closed. Should the power line be improperly connected to the feed-thru terminals, e.g., mis-wired, the receptacle contacts remain energized even if one of the predetermined fault conditions is present in the load that is connected to the receptacle contacts via the plug connector. One drawback to this approach is that a mis-wire condition results in the receptacle contacts not being protected from a fault condition.

In another approach that has been considered, the lack of protection to the receptacle terminals when the protective device is mis-wired has only been partially addressed. This approach employs a circuit that prevents interrupting contacts from remaining closed when the protective device has been mis-wired. Since the interrupting contacts do not remain closed, there is lack of power to the down-stream receptacles which are connected to the line terminals. Typically, the open or closed condition of the interrupting contacts are visually indicated to the user by the position of a button, indicator lamp, or audible alarm. When the visual indicator signals that the interrupting contacts are in an open condition, or there is loss of power on the downstream receptacles, the installer is thereby prompted to correct the mis-wired condition. This approach also has its drawbacks. If the branch circuit does not include downstream receptacles, in which case the feed-thru terminals are not used, the installer is not alerted to the mis-wire condition by denial of power to either the downstream branch circuit or to the receptacle contacts. Lack of protection of the receptacle contacts is only evident to the installer if the signal or absence of signal from the visual indicator is understood. Visual indication is much more easily ignored than power denial and the mis-wire condition may not be corrected.

Historical problems with these devices include the possibility of the line and load being mis-wired by an installer. A variety of methods have been used to prevent, or attempt to prevent, mis-wiring, with varying levels of success. Labels and installation instruction sheets have been used to prevent mis-wiring, but can be ignored by the installer. Preventing the problems associated with a defective solenoid driving device is inherently more difficult. Solenoid bum-out has been revealed by testing the protective with a test button, but the result of the test can be ignored by the user.

What is needed is means for detecting a mis-wire condition that may be employed in conjunction with a physical barrier that prevents insertion of a plug into the receptacle until such time as power has been properly connected to the line terminals of the protection device

SUMMARY OF THE INVENTION

The present invention addresses the needs described above. The present invention provides a means for detecting a mis-wire condition that is employed in conjunction with a protective shutter. The shutter prevents insertion of a plug into the receptacle until such time as power has been properly connected to the line terminals of the protection device.

One aspect of the present invention is a protection device that is coupled to a power source in an electric power distribution system. The protection device is configured to protect a portion of the power distribution system from at least one fault condition. The device includes line terminals configured to be coupled to the power source when a proper wiring condition is effected. A receptacle member includes receptacle openings configured to accommodate plug contact blades. Receptacle contacts are disposed in the receptacle member and coupled to the line terminals. An electrical connection is established between the receptacle contacts and the line terminals. At least one protective shutter is movable between a closed position and an open position. The at least one protective shutter is disposed between the receptacle openings and the receptacle contacts in the closed position to prevent the plug blades from making contact with the receptacle contacts. A mis-wiring sensor is coupled to the line terminals. The mis-wiring sensor is configured to sense the proper wiring condition and actuate the protective shutter in response thereto, such that the protective shutter moves from the closed position to the open position. After the protective shutter moves to the open position, the plug blades are permitted to make contact with the receptacle contacts upon insertion of the plug blades into the receptacle openings.

In another aspect, the present invention includes a protection device coupled to the power source disposed in an electric power distribution system. The protection device is configured to protect a portion of the power distribution system from at least one fault condition. The device includes line terminals configured to be coupled to the power source when a proper wiring condition is effected. A receptacle member includes receptacle openings configured to accommodate a plurality of plugs. Receptacle contacts are coupled to the line terminals, such that an electrical connection is established between the receptacle contacts and the line terminals. A plurality of protective shutters are provided. Each protective shutter is movable between a closed position and an open position. Each protective shutter is disposed between the receptacle openings and the receptacle contacts in the closed position, to prevent plug blades from making contact with the receptacle contacts. A plurality of pivot arms are also provided. Each pivot arm is removably coupled to a protective shutter in the closed position. A cam member is coupled to the plurality of pivot arms. The cam member is configured to rotate around an axis of rotation to thereby move each pivot arm in a linear direction such that the protective shutter coupled thereto is moved from the closed position to the open position. A mis-wiring sensor is coupled to the line terminals and the cam member. The mis-wiring sensor is configured to sense the proper wiring condition and rotate the cam member in response thereto.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
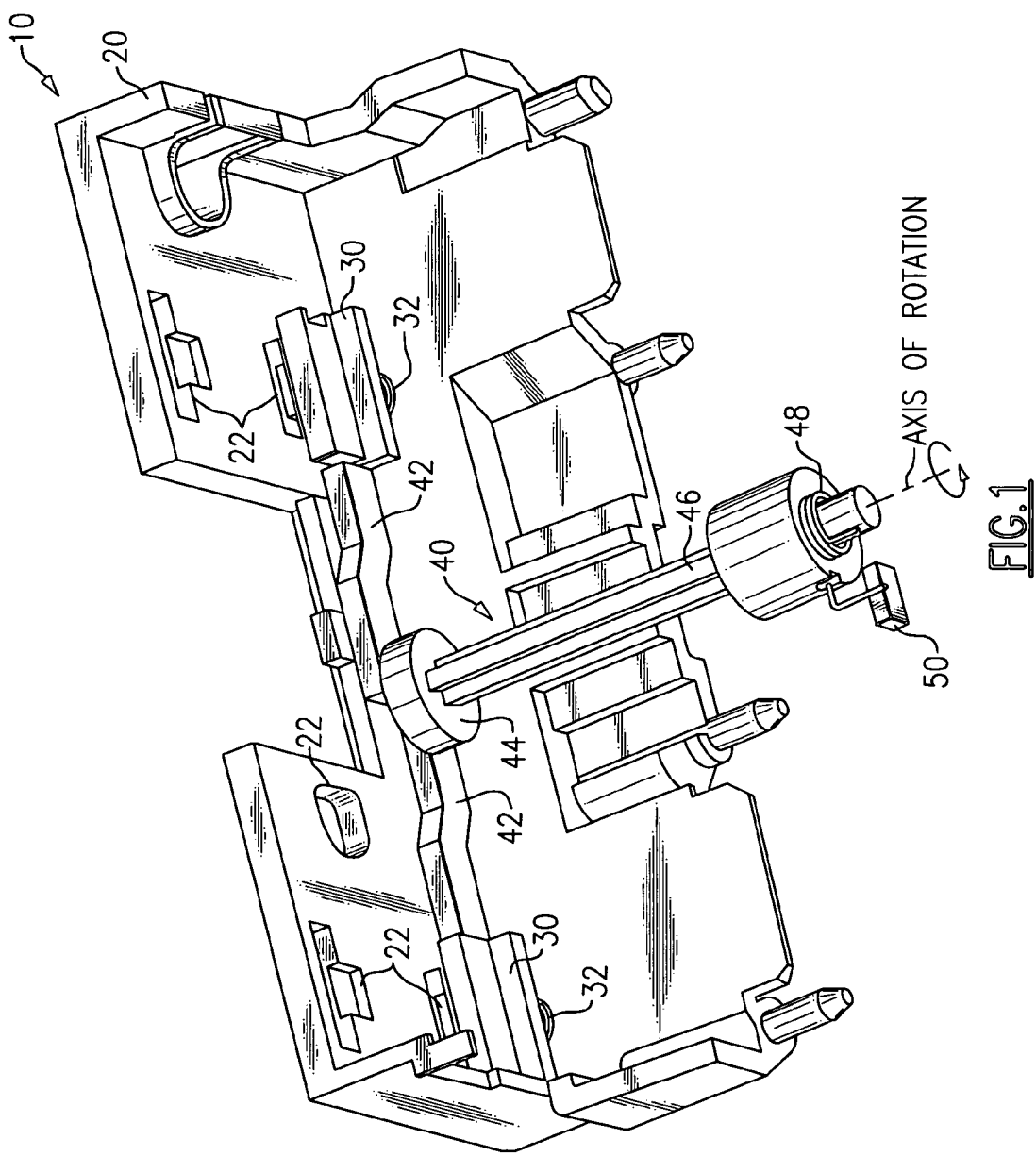
FIG. 1 is a perspective view of the shuttered receptacle in accordance with the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the shuttered protective device of the present invention is shown in FIG. 1, and is designated generally throughout by reference numeral 10.

In accordance with the invention, the present invention is a protection device that is coupled to a power source in an electric power distribution system. The protection device is configured to protect a portion of the power distribution system from at least one fault condition. The device includes line terminals configured to be coupled to the power source when a proper wiring condition is effected. A receptacle member includes receptacle openings configured to accommodate plug contact blades. Receptacle contacts are disposed in the receptacle member and coupled to the line terminals. An electrical connection is established between the receptacle contacts and the line terminals. At least one protective shutter is movable between a closed position and an open position. The at least one protective shutter is disposed between the receptacle openings and the receptacle contacts in the closed position to prevent the plug blades from making contact with the receptacle contacts. A mis-wiring sensor is coupled to the line terminals. The mis-wiring sensor is configured to sense the proper wiring condition and actuate the protective shutter in response thereto, such that the protective shutter moves from the closed position to the open position. After which, the plug blades are permitted to make contact with the receptacle contacts upon insertion of the plug blades into the receptacle openings. Thus, the present invention provides a means for detecting a mis-wire condition that is employed in conjunction with a protective shutter. The shutter prevents insertion of a plug into the receptacle until such time as power has been properly connected to the line terminals of the protection device.

As embodied herein, and depicted in FIG. 1, a perspective view of the protection device 10 in accordance with the present invention is disclosed. Device 10 includes linkage assembly 40 disposed within receptacle 20. Receptacle 20 is of a type commonly employed in the art. As such, the receptacle contacts, the feed through terminals, and the line terminals are not shown for clarity of illustration. Referring back to FIG. 1, linkage assembly 40 is mechanically coupled to protective shutter 30. Before device 10 is wired correctly, each protective shutter 30 is disposed in a closed position, e.g., between at least one of receptacle openings 22 corresponding to a receptacle contact. Protective shutters 30 prevent plug blades from making contact with the receptacle contacts when in the closed position. Mis-wiring sensor 50 is coupled both to the line terminals and linkage assembly 40. Mis-wiring sensor 50 senses when device 10 has been properly wired. When the device has been properly wired, sensor 50 actuates linkage assembly 40 causing the protective shutter to move from the closed position to the open position. In the open position, the plug blades are permitted to make contact with the receptacle contacts upon insertion of the plug blades into the receptacle openings.

Figure 2:
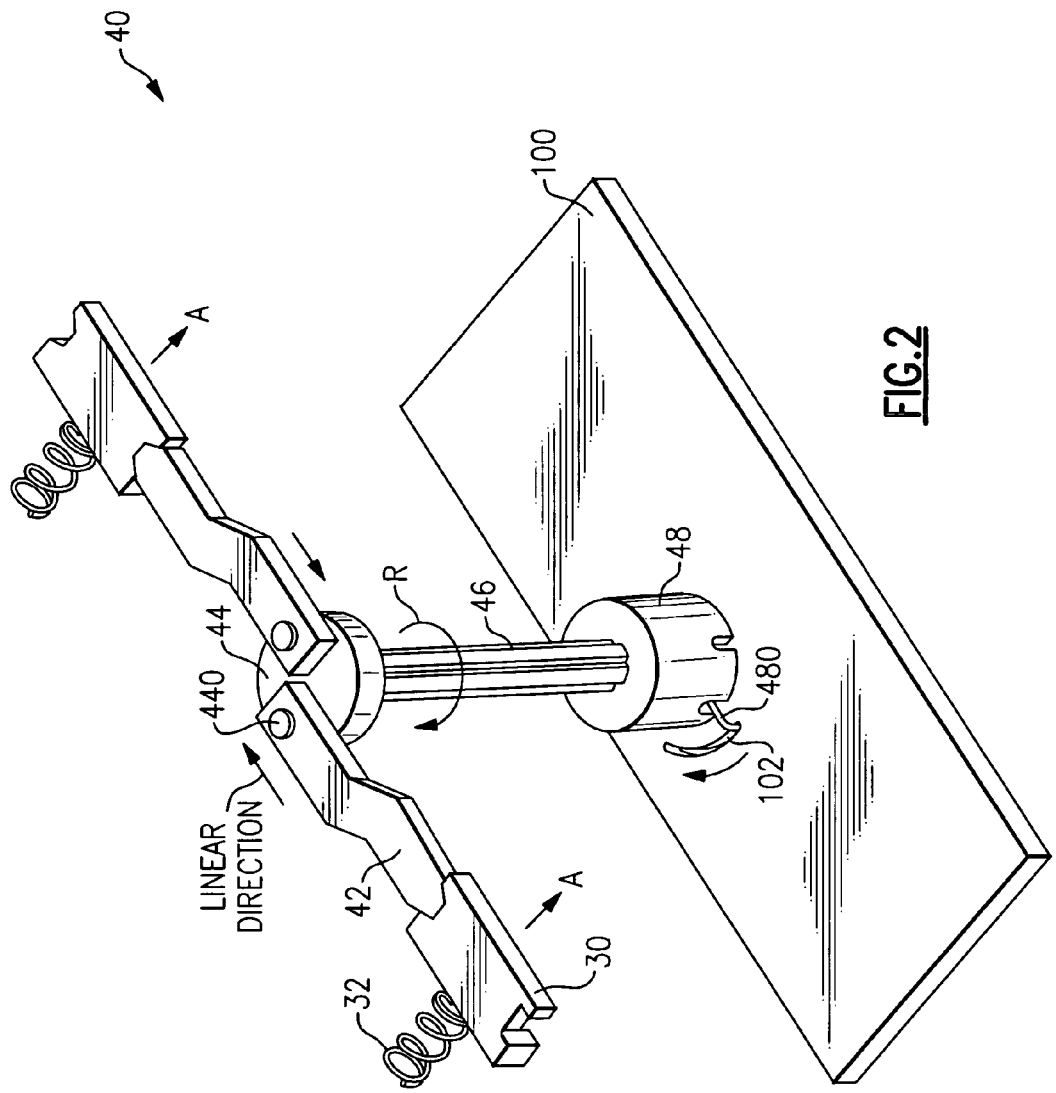
FIG. 2 is a detailed view of the linkage assembly shown in FIG. 1.

Referring to FIG. 2, a detailed view of the linkage assembly 40 shown in FIG. 1 is disclosed. Linkage assembly 40 includes two pivot arms 42, each of which are removably coupled to a protective shutter 30 in the closed position. Cam member 44 is coupled to pivot arms 42, by way of pivots 440. The cam member is configured to rotate around an axis of rotation to thereby move the pivot arms 42 in the linear direction as shown. Rotor 46 is coupled to cam 44 at one end, and is also coupled to circuit board 100 at an opposite end. A torsion spring assembly 48 is coupled to rotor 46. Spring assembly 48 includes torsion spring 480 which is coupled to mis-wiring sensor 50, which is not shown in this view. In the closed position, torsion spring 480 is in tension, and stores mechanical energy. When sensor 50 sensor senses the proper wiring condition, it releases spring 480, allowing it to move within slot 102. The stored mechanical energy is released, causing rotor 46 to rotate cam 44 about the axis of rotation. In response, each pivot arm 42 is moved in a linear direction as shown.

In the closed position, spring 32 is disposed between the interior of receptacle body 20 and an edge of protective shutter 30. In this position, spring 32 is in tension. When pivot arms 42 are moved, each pivot arm 42 detaches from shutter 30. The energy stored in spring 32 is released and each spring member 32 pushes protective shutter 30 into the open position.

Figure 3:
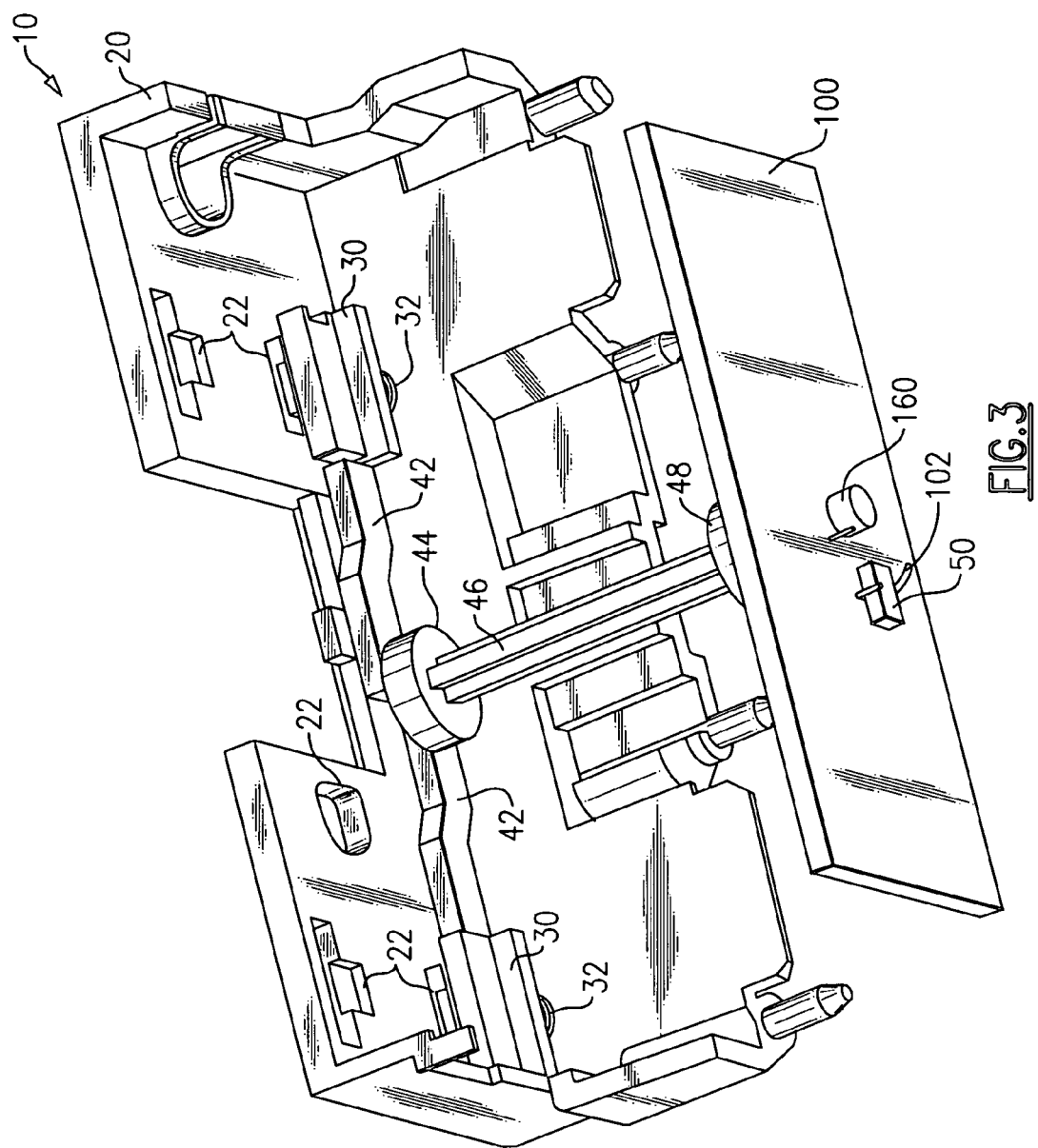
FIG. 3 is a detail view showing the interconnection of linkage assembly 40 and circuit board 100.

Referring to FIG. 3, a detail view showing the interconnection of linkage assembly 40 and circuit board 100 is shown. Rotor 46 includes a cylindrical portion 460 which is configured to be inserted into a round hole disposed in circuit board 100. Mis-wire sensor 50 is soldered to the underside of circuit board 100. In this embodiment, sensor 50 is implemented as a resistor. When device 10 is properly wired, current begins to flow through resistor 50 causing the resistor to over-heat. In one embodiment, the solder that connects resistor 50 to the board gives way, and spring portion 480 is allowed to move within slot 102. In another embodiment, the resistor 50 burns away, and spring 480 is allowed to move within slot 102. When this happens, the circuit that incorporates resistor 50 is open. This will be explained in more detail in the discussion pertaining to FIG. 5.

Figure 4:
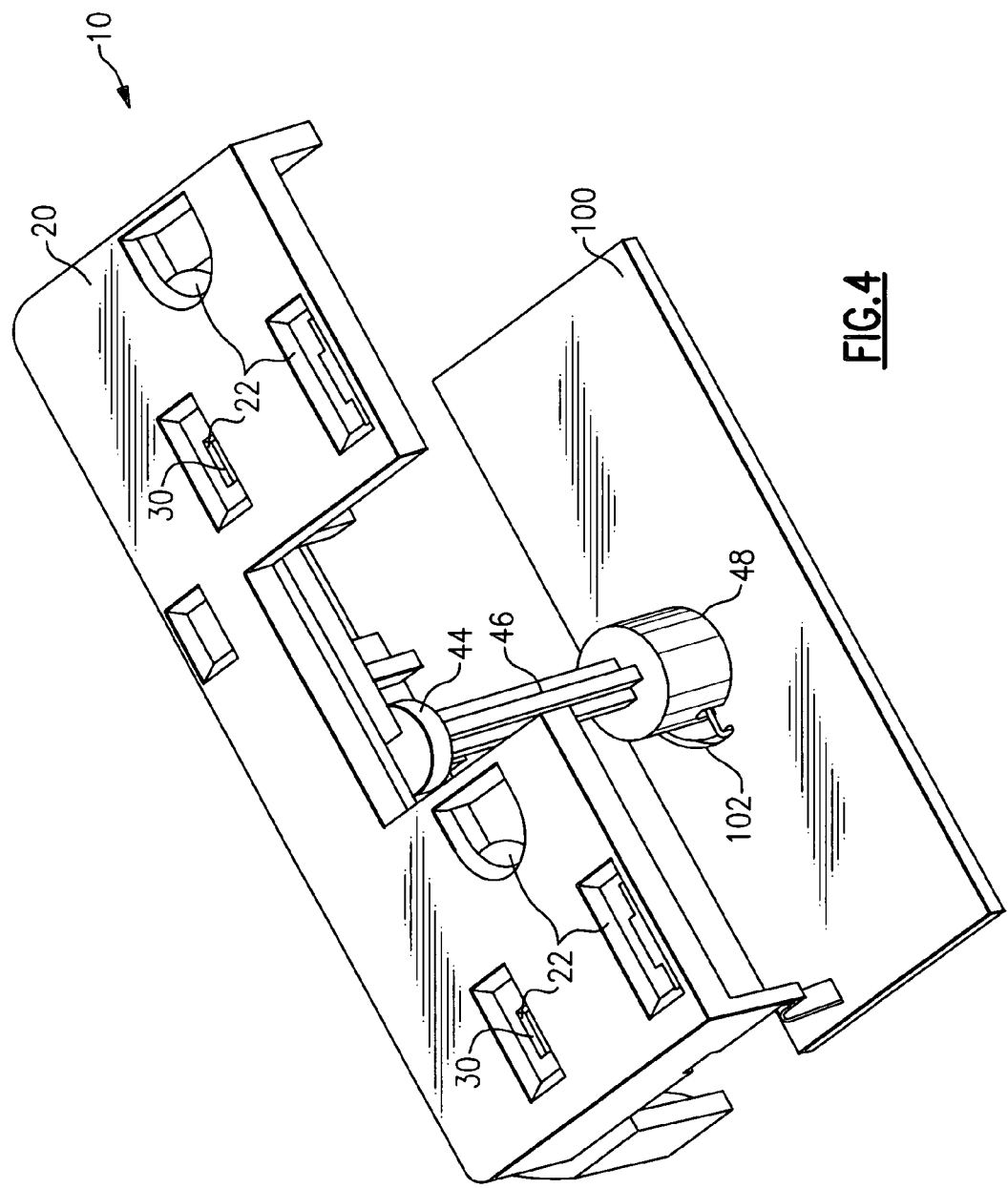
FIG. 4 is a front view of the receptacle body shown in FIG. 1.

Referring to FIG. 4, a front view of the receptacle body 20 is shown in the closed position. In this view, it is important to note that protective shutter 30 blocks at least one opening 22, preventing plug blades from making contact with the corresponding receptacle contact disposed within receptacle body 20.

Figure 5:
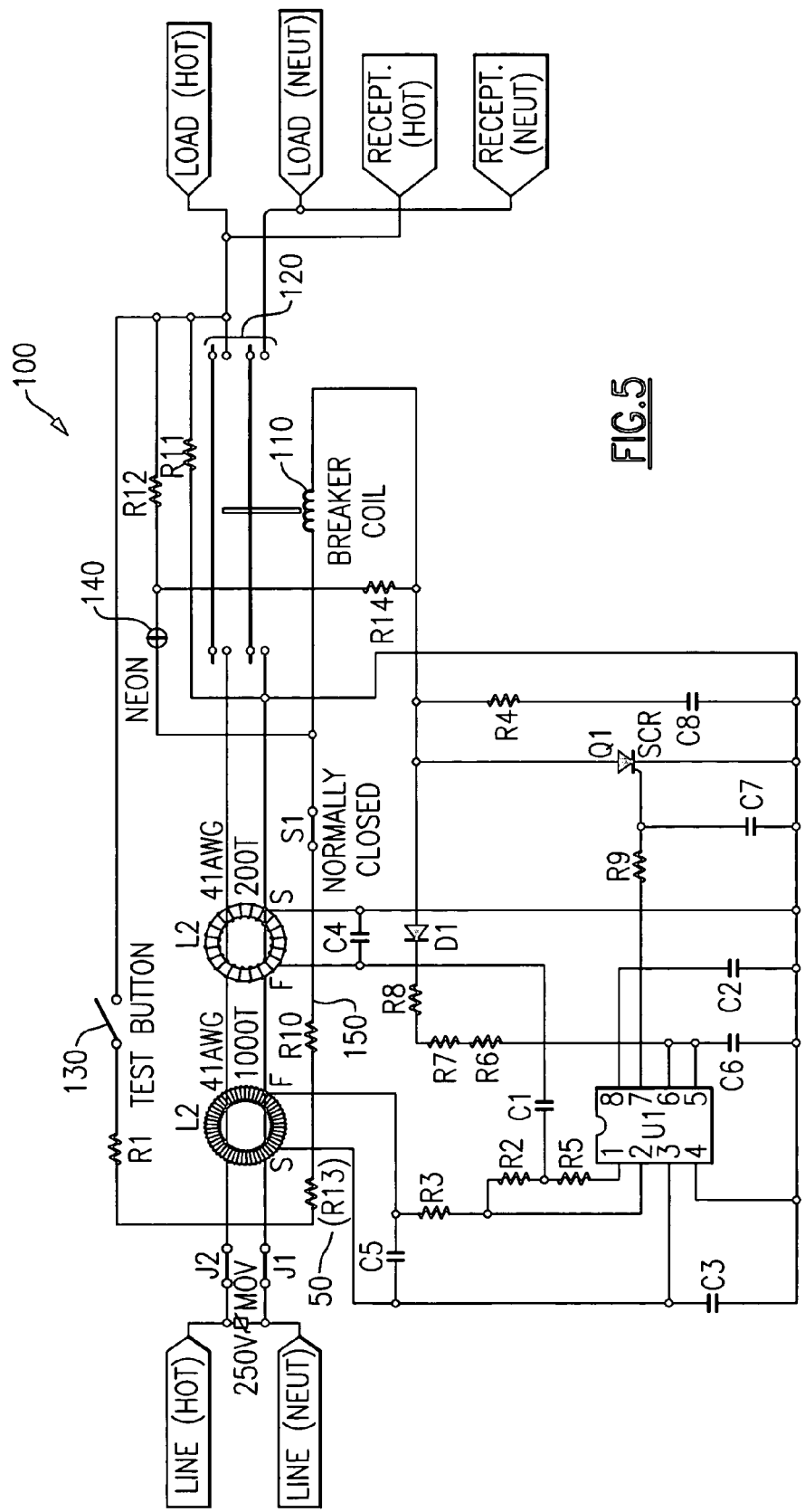
FIG. 5 is a schematic of the fault detection circuit in accordance with an embodiment of the present invention.

As embodied herein, and depicted in FIG. 5, a schematic of the fault detection circuit in accordance with an embodiment of the present invention is disclosed. Referring to FIG. 5, a GFCI circuit is shown generally at 101 which may be coupled to circuit board 100. When a differential transformer L1 senses unequal amounts of current flowing in the hot and neutral conductors due to a ground fault condition, circuit 101 causes a breaker coil 110 to activate, opening circuit interrupting mechanism 120. Circuit interrupting mechanism 120 conventionally includes hot and neutral bus bars that make and break contact with the hot and neutral power lines, respectively, via contacts located on both the bus bars and power lines at four contact points. A test button 130 induces a simulated ground fault when pushed in and causes breaker coil 110 to activate.

This improved GFCI contains two unique features that address the problems noted in the background section. The first is a mis-wire circuit 150 which uses resistor 50 (R13) as a fault resistance that creates a differential current on the primary of the differential current transformer L1. The differential current exceeds the level of differential current that the GFCI has been designed to interrupt, typically 6 milliamperes. Fault resistor R13 is on the line side of circuit interrupting mechanism 120 electrically located between the line and load terminals of the hot and neutral wire paths. The ground fault circuit sensing electronics of GFCI circuit 101 derives power from the line side terminals of the GFCI.

Should the GFCI be wired in a mode where power is supplied to the load terminals, i.e., mis-wired, and if the GFCI is tripped, that is, the contact points in the circuit interrupting mechanism 120 are open, nothing visible happens. If the GFCI is in the reset condition, that is, the contact points in the circuit interrupting mechanism are closed, it will immediately trip when powered. In this mode, the current flowing through the fault resistance R13, derived from the line terminal side of the device, is interrupted when the device trips. The estimated time it takes for the fault resistance R13 to burn away is greater than 50 ms. Because the trip time of the GFCI is less than or equal to 25 ms, fault resistance R13 does not have enough time to burn away. If one attempts to reset the device when in the mis-wired condition, the device immediately trips out again, and this continues until such time as the device is wired correctly, that is, when power is applied to the GFCI at the line terminals. This effectively results in a GFCI that will not operate, i.e., be able to be reset to provide power to the line terminals or open shutters 30 until such time as the device is properly wired. In light of the above description of FIGS. 1–5, it becomes apparent that resistor 50 has several functions.

When electrical power is connected in a correct manner to the line terminals, a differential current is created by the fault resistance R13 when power is applied to the device. If the device is reset before power is applied, the device trips as a result of this differential current. If the device is already in the tripped condition before power is applied, nothing visible happens. However, because the fault resistance is on the line side of the circuit interrupting mechanism 120, current through fault resistance R13 continues to flow, regardless of interrupting contacts 120 being open. This internal differential current, created by the fault resistance R13, heats fault resistance R13 until it burns away, typically in 50 ms. This can be accomplished by selecting a resistor or resistors whose power rating is greatly exceeded by the current, such that the resistor or resistors open. Once the device has been properly wired with power connected to the line terminals and fault resistance R13 has burned away, spring portion 480 is allowed to move within slot 102, allowing shutters 30 to move to the open position. When resistor R13 has burned away, there is no longer a fault current. The device can be reset and provide its normal protective functions to the receptacle contacts and to the feed-thru terminals.

Figure 6:
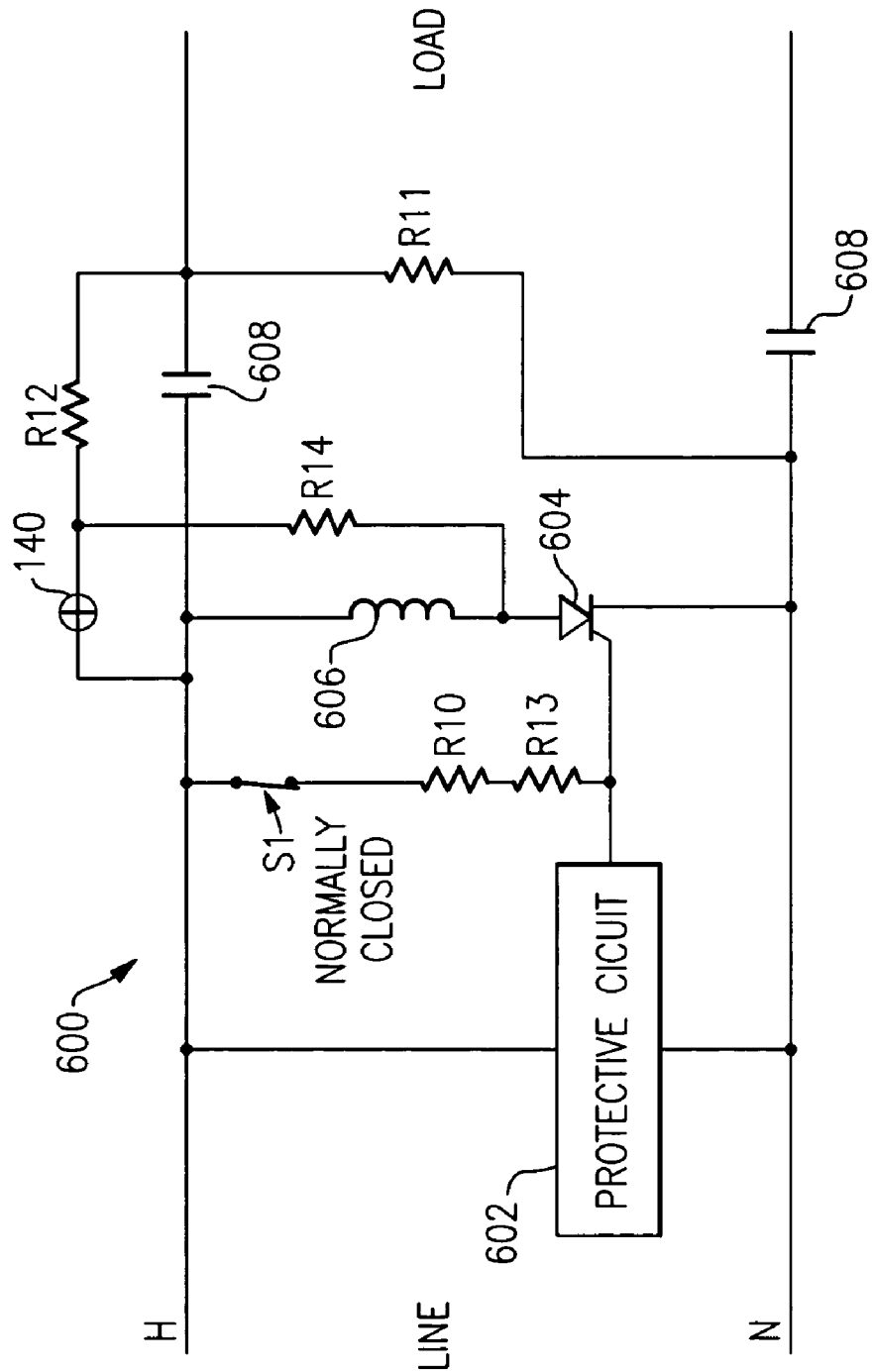
FIG. 6 is a schematic of the fault detection circuit in accordance with another embodiment of the present invention.

Referring to FIG. 6, an embodiment of the schematic is shown at 600. The embodiment is similar to the one shown in FIG. 5 except that it is generalized to apply to different protective devices such as ground fault circuit interrupters (GFCI's) or devices intended to interrupt ground faults from personnel contact with a power line conductor of the electrical distribution system, arc fault circuit interrupters (AFCI's) intended to interrupt line current which if allowed to continue could cause an electrical fire, combination devices that provide both AFCI and GFCI protection, or the like.

According to this embodiment, the protective devices mentioned have a protective circuit 600 that may be coupled to printed circuit board 100. Protective circuit 600 detects the respective fault condition, turning on an electronic switching device such as SCR 604, energizing a solenoid 606 coil which receives power from the line conductors, to open interrupting contacts 608. Fault resistance R13 has the same function as has been described above. When power is mis-wired to the load terminals and the protective device is reset such that interrupting contacts 608 are closed, current flows through fault resistance R13 and the gate-cathode junction of SCR 604, energizing solenoid 606 and tripping the interrupting contacts 608. Fault resistance R13 is chosen to withstand the current flow for the time that power is applied to the load terminals to the moment when interrupting contacts 608 open, approximately 25 milliseconds. If line power is connected as intended to the line terminals of the protective device, current flows through fault resistance R13 and the gate cathode junction of SCR 604 until such time as fault resistance R13 burns away, after which time it is possible to accomplish a resetting of the interrupting contacts 608. Solenoid 606 is designed not to burn out during the interval that SCR 604 is conductive, which interval is designed to be approximately 100 milliseconds. In this manner the protective functions described in FIG. 1 are provided without necessarily requiring the components typically associated with a GFCI, e.g., the differential current transformer L1 as shown in FIG. 5, or a fault resistor circuit connected to both the hot and neutral line conductors for producing a differential current. If an electronic switching device other than an SCR is used, e.g., a bipolar transistor, the connections shown here as being made to the gate of the SCR would instead be made to the base of the bipolar transistor. 'Gate" and "base" are intended to have an equivalent meaning in this specification and claims.

To those skilled in the art there are number of ways of configuring mis-wire sensor 50 to respond to the proper wiring condition to move shutters 30 from a closed position to an open position. As has been described, fault resistance R13 is contiguous when the protective device is mis-wired but bums away when the protective device is properly wired. As an alternative, fault resistance R13 is contiguous when the protective device is mis-wired but heats sufficiently when properly wired to melt solder pads to which fault resistance R13 is connected whereupon the mechanical energy of spring 480 allows displacement of fault resistance R13. When this happens, spring 480 moves within slot 102 allowing shutters 30 to move from a closed position to an open position.

Reference is made to U.S. Pat. No. 6,522,510, and U.S. patent application Ser. No 09/827,007, which are incorporated herein by reference as though fully set forth in their entirety, for a more detailed explanation of the protective device of the present invention.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A protection device coupled to a power source disposed in an electric power distribution system, the protection device being configured to protect a portion of the power distribution system from at least one fault condition, the device comprising:
    line terminals configured to be coupled to the power source when a proper wiring condition is effected;
    a receptacle member including receptacle openings configured to accommodate plug contact blades;
    receptacle contacts disposed in the receptacle member and coupled to the line terminals, an electrical connection being established between the receptacle contacts and the line terminals;
    at least one protective shutter movable between a closed position and an open position, the at least one protective shutter being disposed between at least one receptacle opening and the corresponding receptacle contact in the closed position to prevent the plug blades from making contact with the receptacle contacts; and
    a mis-wiring sensor coupled to the line terminals, the mis-wiring sensor being configured to sense the proper wiring condition and actuate the protective shutter in response thereto, such that the protective shutter moves from the closed position to the open position, whereby the plug blades are permitted to make contact with the receptacle contacts upon insertion of the plug blades into the receptacle openings.

2. The device according to claim 1, further comprising feed-thru terminals configured to provide an electrical connection to a downstream receptacle, the at least one protective shutter being in the closed position when the power source is connected to the feed-thru terminals instead of the line terminals.

3. The device according to claim 1, further comprising:
    a fault detector coupled to the line terminals, the fault detector being configured to detect the at least one fault condition; and
    interrupting contacts disposed between the line terminals and the at least one receptacle, the interrupting contacts being configured to disconnect the power source from the at least one receptacle upon detection of the at least one fault condition.

4. The device according to claim 3, wherein the at least one fault condition includes a ground fault condition.

5. The device according to claim 3, wherein the at least one fault condition includes an arc fault condition.

6. The device according to claim 3, further comprising feed-thru terminals configured to provide an electrical connection to a downstream receptacle, the interrupting contacts being disposed between the line terminals and the feed-thru terminals and configured to disconnect the source of power from the feed-thru terminals upon detection of the at least one fault condition.

7. The device according to claim 1, wherein the mis-wiring sensor includes at least one resistor.

8. The device according to claim 1, further comprising:
    a fault detection circuit configured to detect the at least one fault condition and provide a fault detect signal in response thereto;
    interrupting contacts coupled to the fault detection circuit and disposed between the line terminals and the at least one receptacle, the interrupting contacts being configured to disconnect the power source from the at least one receptacle in response to receiving the fault detect signal; and
    a mis-wire circuit coupled to the fault detection circuit and including the mis-wiring sensor, the mis-wiring circuit causing the fault detection circuit to detect the at least one fault condition when an improper wiring condition is effected.

9. The device according to claim 8, wherein the mis-wiring sensor is configured to open the mis-wire circuit when the mis-wiring sensor senses the proper wiring condition.

10. The device according to claim 9, wherein the mis-wiring sensor includes at least one resistor.

11. The device according to claim 10, wherein the proper wiring condition causes an amount of current to flow in the at least one resistor for at least a predetermined duration, such that the mis-wire circuit is opened and the protective shutter is moved from the closed position to the open position.

12. The device according to claim 11, wherein the proper wiring condition causes a current to flow for at least a predetermined duration, such that the resistor heats to a temperature greater than the melting point of solder, such that the mis-wire circuit is opened and the protective shutter is moved from the closed position to the open position.

13. The device according to claim 8, wherein the fault detection circuit includes a ground fault circuit interrupter (GFCI) detection circuit.

14. The device according to claim 8, wherein the fault detection circuit includes an arc fault circuit interrupter (AFCI) detection circuit.

15. The device according to claim 1, further comprising:
    a fault detection circuit disposed on a circuit board, the fault detection circuit being configured to detect the at least one fault condition and provide a fault detect signal in response thereto, the mis-wiring sensor being disposed on the circuit board; and interrupting contacts coupled to the fault detection circuit and disposed between the line terminals and the at least one receptacle, the interrupting contacts being configured to disconnect the power source from the at least one receptacle in response to receiving the fault detect signal.

16. The device according to claim 15, further comprising:
at least one pivot arm removably coupled to the at least one protective shutter in the closed position; and
a cam member coupled to the at least one pivot arm, the cam member being configured to rotate around an axis of rotation to thereby move the at least one pivot arm in a linear direction to thereby move the at least one protective shutter from the closed position to the open position.

17. The device according to claim 16, further comprising at least one spring member coupled to the at least one protection shutter, the at least one spring member being configured to decouple the at least one protective shutter from the at least one pivot arm when the at least one pivot arm moves in the linear direction.

18. The device according to claim 16, wherein the at least one pivot arm includes a first pivot arm and a second arm coupled to the cam member, the first pivot arm being removably coupled to a first protective shutter in a first receptacle closed position, and the second pivot arm being removably coupled to a second protective shutter in a second receptacle closed position.

19. The device according to claim 16, further comprising:
a rotor coupled to the cam member at a first end, and coupled to the circuit board at a second end; and
a torsion spring assembly coupled to the rotor and the mis-wiring sensor, the torsion spring assembly being configured to release stored mechanical energy when the mis-wiring sensor senses the proper wiring condition, such that the rotor causes the cam member to rotate about the axis of rotation to thereby move the at least one pivot arm in the linear direction.

20. The device according to claim 19, wherein the mis-wiring sensor includes at least one resistor coupled to a portion of the torsion spring assembly by a solder connection.

21. The device according to claim 20, wherein the proper wiring condition causes a current to flow in the at least one resistor for at least a predetermined duration, such that the resistor heats to a temperature greater than the melting point of solder, such that the solder connection is broken, causing the torsion spring assembly to release the stored mechanical energy.

22. A protection device coupled to power source disposed in an electric power distribution system, the protection device being configured to protect a portion of the power distribution system from at least one fault condition, the device comprising:
line terminals configured to be coupled to the power source when a proper wiring condition is effected;
a receptacle member including receptacle openings configured to accommodate a plurality of plugs;
receptacle contacts coupled to the line terminals, an electrical connection being established between the receptacle contacts and the line terminals;
a plurality of protective shutters, each protective shutter being movable between a closed position and an open position, each protective shutter being disposed between at least one receptacle opening and corresponding receptacle contact in the closed position to prevent plug blades from making contact with the receptacle contacts;
a plurality of pivot arms, each pivot arm being removably coupled to a protective shutter in the closed position;
a cam member coupled to the plurality of pivot arms, the cam member being configured to rotate around an axis of rotation to thereby move each pivot arm in a linear direction to thereby move the protective shutter coupled thereto from the closed position to the open position; and
a mis-wiring sensor coupled to the line terminals and the cam member, the mis-wiring sensor being configured to sense the proper wiring condition and enable rotation of the cam member in response thereto.

23. The device according to claim 22, further comprising:
a rotor coupled to the cam member; and
a torsion spring assembly coupled to the rotor and the mis-wiring sensor, the torsion spring assembly being configured to release stored mechanical energy when the mis-wiring sensor senses the proper wiring condition, such that the rotor causes the cam member to rotate about the axis of rotation to thereby move the at least one pivot arm in the linear direction.

24. The device according to claim 23, wherein the mis-wiring sensor includes at least one resistor coupled to a portion of the torsion spring assembly by a solder connection.

25. The device according to claim 23, wherein the proper wiring condition causes an amount of current to flow in the at least one resistor for at least a predetermined duration, such that the resistor heats to a temperature greater than the melting point of solder, such that the solder connection is broken, whereby the torsion spring assembly releases the stored mechanical energy.

* * * * *